Patented July 8, 1952

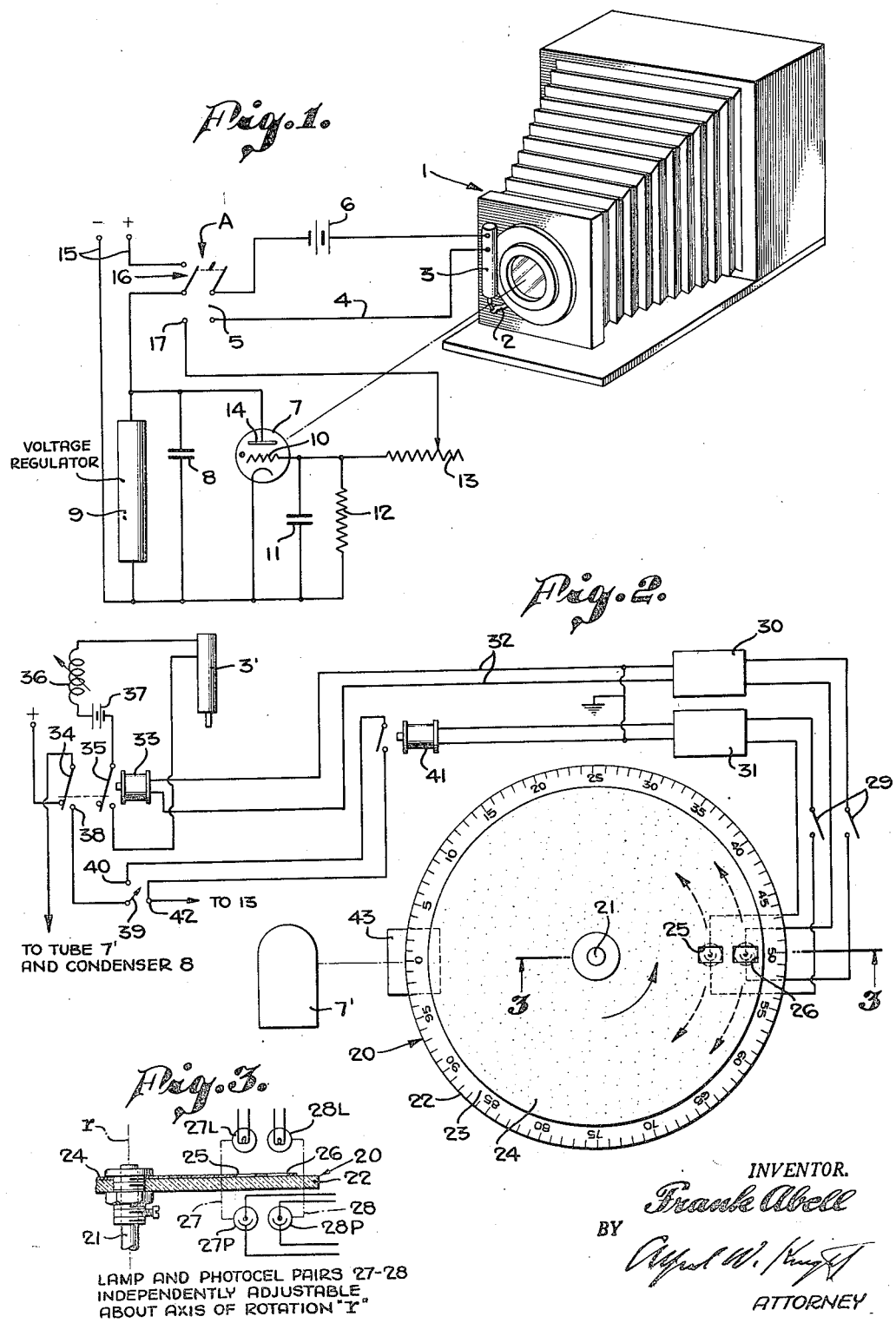

2,602,324

UNITED STATES PATENT OFFICE 2,602,324

APPARATUS FOR OBSERVING OPERATING CHARACTERISTICS OF MOVING ELEMENTS

Frank Abell, Inglewood, Calif.

Application September 13, 1947, Serial No. 773,854

4 Claims. (Cl. 73—5)

This invention relates to means for measuring minute time lapses or intervals in connection with the finite movement of movable parts or devices, and pertains particularly to an apparatus which may be employed for the observation of the position adopted by a moving member at a given time interval after the initiation of such movement or after the operation (or movement to a given position) of another member, or to the determination of the time interval between two successive positions of a moving member.

The apparatus of this invention is adapted for use in many problems where the position of a moving member after a given time interval of movement is desired to be known, where the time interval between a starting position and a given operative position is desired, or where the time relationship between two related moving parts, or two related positions of a given moving part, is to be determined.

The apparatus of this invention finds particular application in the problem of determining the operating characteristics of photographic shutters, for example, as where it is desired that the time interval between the opening and closing positions of the shutter leaves be determined, so that the duration of the "exposure" will be known. Modern "high-speed" shutters have been found often to be materially in error, when the actual shutter speed is compared with that marked on the exposure-setting index, and even the best obtainable shutter is likely to exhibit errors when operated at a temperature different from that at which it was designed to operate.

In view of the above, it is one of the particular objects of this invention to provide an interval measuring apparatus adapted particularly for the determination of the operating characteristics of photographic shutters.

A further object of the invention is to provide a device for the visual observation of the position of a moving part under a very short duration illumination of sufficient intensity to form a persistent visual image, at a known time interval after the initiation of the movement of such part, or after the location of such moving part in a prior position related to the position which is to be observed.

A further object of the invention is to provide a device for the production of a short-duration light or illumination pulse at a given and relatively minute time interval following the happening of a given event, such as the initiation of the movement of a given part, the adoption of a given position by a related part, or the like, whereby the movement or position of a given moving element may be observed under such illumination pulse at the completion of such time interval.

A further object is to provide a device of the character set forth, which is of simple and relatively inexpensive construction as compared to prior suggested structures of comparable utility, and which may be utilized without special training or specific skill, thereby making the device of utility to the average photographer.

The apparatus of my invention may comprise, essentially, an illumination-pulse producing electronic tube member, together with means for causing such tube member to produce an illumination pulse, and means for controlling the time of producing said pulse with relation to a given starting operation under the control of the operator. More particularly, the apparatus may include a grid-controlled gaseous-discharge tube, means for applying a given cathode-plate potential upon the tube, and means for applying a control potential to the control grid of such tube, said last-named means being provided with a variable time-delay means whereby the desired control potential is applied to the control grid at a desired time interval after the happening of a given event.

The above and other objects of my invention will be apparent from the following specific description of two illustrative embodiments thereof or will be apparent from such description. The accompanying drawings schematically illustrate these embodiments, and referring thereto:

Fig. 1 is a representation of my invention as applied to the testing of a photographic shutter;

Fig. 2 is a schematic showing of a modified or supplemental time-delay arrangement useful with the main circuit and apparatus elements shown in Fig. 1; and Fig. 3 is a sectional detail as taken on line 3—3 in Fig. 2.

Referring to Fig. 1, a photographic camera is shown at 1, provided with a shutter mechanism (of which only the operating lever 2 is illustrated) at the position of the photographic lens, a solenoid 3 being provided for tripping the shutter upon closing a circuit 4 through switch portion 5 of a double-pole double-throw switch A which energizes the solenoid 3 through the agency of battery 6. The device is intended to provide a momentary pulse of illumination upon the shutter for visual observation of the position of the shutter leaves (not shown) at a given time interval after energization of the solenoid 3 and consequent operation of the shutter. To this end I provide a short-duration glow tube, such as a grid controlled gaseous discharge tube 7, in position to illuminate the shutter, which may be viewed from either the front or rear of the camera.

The operation or "flash" of the tube 7 is caused to take place through the discharge of a fixed condenser 8, which is normally kept charged to a given potential through a voltage-regulation system 9. The control grid 10 of the tube 7 is caused to be brought up to a potential sufficient to fire the tube 7, and thus establish a controlled time-delay function, through a resistance : capacity (RC) delay network represented by a grid : cathode condenser 11 shunted by a bleeder resistor 12 (to prevent the grid 10 from floating) and a potentiometer 13 adapted for series connection from the grid 10 to the plate 14 of the tube 7 and the plate side of condenser 8. The supply of potential to condenser 8 is normally maintained through line leads 15 by switch portions 16 of switch A, switch portion 5 being in an "open" position in this condition.

When it is desired to operate the device, switch A is moved from the upper position (connecting the leads 15 through to the condenser 8 and the plate of tube 7) to the lower position, in which the condenser 8 is connected through terminal 17 to the RC network through potentiometer 13, which causes the firing potential to be applied from the condenser 8 to the tube 7 at the control grid 10. The lag between the time of closing the circuit from condenser 8 to the RC network and the firing of tube 7 is a function of the potential to which condenser 8 is charged, the value of condenser 11, and the resistance of potentiometer 13. The charge potential of condenser 8 may be maintained quite constant by conventional voltage regulating means 9, the value of condenser 11 is a constant, wherefore the control of this lag is obtainable by variation of the resistance of the potentiometer 13. The circuit values may be so selected that the potentiometer may be calibrated in time intervals of 0.0001 second, if desired.

In the use of the device, the circuit to the solenoid 3 is closed, by operation of switch A, simultaneously with the closing of the circuit from condenser 8 to potentiometer 13. The initiation of the operation of the shutter mechanism is thus coincident with the start of the time interval after which the tube 7 is to fire or flash. After this time interval has taken place, the flash of the tube 7 illuminates the shutter for a very short period, and if the operation is conducted in a condition of reduced general illumination, and if the observer's eyes are directly shielded from the tube 7, a retinal image of the position of the shutter leaves is obtained by the observer, the duration of the "flash" of the tube 7 being readily established at a value (say in the order of 1/30,000 second) such that the movement of the shutter leaves is for all practical purposes "frozen" to the eyes of the observer. The setting of the potentiometer 13 is altered, for example, during repetitions of the operation, so as to cause the tube 7 to flash just as the shutter is opening, and the time noted from the setting of the potentiometer dial. The delay is then increased by adjustment of the dial until the full open position of the shutter is observed, and the time delay noted. The delay is then further increased until the start of the closing movement of the shutter is observed, and the new time noted. Similarly, the fully closed position may be observed, and the closing time noted. Such data may be correlated, and the operating characteristics of the shutter fully analyzed.

When the actual operating characteristics of the shutter at desired indicated positions have been determined, the problem of synchronization of the shutter mechanism to various types of "flash-bulbs" becomes a simple matter, by adjusting the initiation of the shutter operation in consonance with the known time characteristics of the flash-bulb, data for which is made fully available by the manufacturer.

The operating characteristics of focal plane shutters may similarly be observed through the back of the camera, and the actual photographic effectiveness thereof at various "speeds" obtained by simple calculation, as will be apparent to one skilled in the art.

In Figs. 2 and 3 I have illustrated a mechanical controlled time delay mechanism which may be employed instead of or in supplement to the variable potentiometer 13, for the purpose of extending or otherwise altering the extent and character of the time delay which is obtained between the initiation of the movement of a given part and the observation of such part, and referring thereto, I may provide an apertured disc 20, mounted on a shaft 21 for rotation about an axis $r$, comprising a transparent disc member 22 provided with a peripheral index 23 and a central section 24 which is opaque except for the provision of a pair of window members 25 and 26, the disc 20 being mounted for rotation between two pairs of lamp-photocell assemblies 27 and 28, the respective photocell assemblies being positioned so that a pair will be aligned with each of the windows 25 and 26. The lamp elements 27L and 28L of the lamp-photocell pairs are intended to be continuously energized during the use of the device and the respective photocell elements 27P and 28P of the lamp-photocell pairs are connected through switch means 29 to two paired amplifiers 30 and 31, the output of one of which is connected through leads 32 to a holding relay 33 provided with a pair of armatures 34 and 35. The armature 34 is a normally closed switch member connecting the power supply to the tube 7' and condenser 8 in the same manner as is obtained by the location of the switch A in its upper closed position (Figure 1). The armature 35 is a normally open switch member which controls the circuit to the member or element which is to be operated for the purpose of a time and/or motion study thereof, and assuming that the device is to be used for inspection of the operating characteristics of a photographic shutter after the manner described in connection with Fig. 1, the circuit controlled by the armature 35 may comprise a shutter operating solenoid 3', a variable load 36 and a battery 37. Upon operation of the relay 33 the armature pairs 34—35 are moved to the right, closing the circuit to the solenoid 3' and shifting the armature 34 to a terminal 38, which is connected to a two-position switch 39 which is adapted for alternative connection as at terminal 40 through the armature of a relay 41 controlled by the output circuit of the amplifier 31 thence to terminal 42 which leads to the glow-tube control circuit of Fig. 1 at a position corresponding to the terminal 17 thereof, or directly to the terminal 42 to by-pass the relay 41.

The lamp and the lamp-photocell pairs 27—28 are mounted for independent rotative positioning about the axis of rotation *r* of the shaft 21, as indicated by the dotted arrows in Fig. 2 so as to provide for the initiation of the operating circuits of the relays 33 and 41 at any desired rotative position of the disc 20, the scale 23 on the disc 20 being positioned for illumination by the glow-tube 7' corresponding to the glow-tube 7 of Figure 1, which tube is also positioned for observation of the moving or movable element which is to be observed, such as a photographic shutter member according to the instant example. The illumination of the index scale 23 may be had directly, or through a conveniently positioned mirror 43 arranged to transmit light through the transparent disc 22 back to the observer's eye, it being appreciated that the index area represented by the position of the mirror 43 is so located as to be in the field of view of the observer at the same time that the shutter or other moving element is observed so that the operator receives a compound visual impression of both the shutter position and the index position at the instant that the glow-tube 7' is caused to flash. I have illustrated the observing position represented by the mirror 43 to be spaced 180° from the light-transmitting windows 25 and 26, the indicia of the peripheral index scale 23 to be extended clockwise and zeroed at the 43 position, and a counter-clockwise direction of rotation to be established for the disc 20. This positional relationship between the indicia on scale 23 and the light-transmitting window means may be varied to suit the requirements of any given utilization of this device. The disc 20 will be rotated by any suitable means which will provide a known and substantially constant rate of rotation, such as a synchronous motor (not shown), so that the indicia intervals of scale 23 will represent known intervals of time.

The above apparatus is subject to operation in many ways, one example of which will be described by way of illustration: Assuming a camera to be established in proper position for viewing its shutter operation upon illumination by the tube 7', and the solenoid 3' properly connected so as to be closed upon operation of the relay 33 and the shutter thereby operated, the drive means for the disc 20 may be set in motion (the lamps 27L and 28L being previously energized). With the potentiometer 13 set in any given position, or a fixed resistance substituted therefor, there will be a given delay between the operation of the relay 33 and the flash of the tube 7', after the switch 29 is closed, assuming the switch 39 to be positioned for connection to the terminal 42. This interval will be indicated by the reading on scale 23 at the instant that the tube 7' flashes. The indicated interval will include the time lag resulting from the amplifier 30 and the relay 33, which can be considered as a known quantity and the position of the lamp-photocell pair 28 may be moved rearwardly with respect to the direction of rotation of the disc 20 to cancel this particular time lag.

The flashing of the glow-tube 7' will also illuminate the moving element which is to be observed, and if a potentiometer 13 is employed in the circuit of the tube 7' the firing of the tube may be caused to take place at an earlier or later interval in order to observe the moving element at a desired position, as above described. Alternatively, the switch 39 may be connected to terminal 40, thus placing it in the circuit of the relay 41, and the position of the lamp-photocell pair 27 rotatably adjusted about the axis *r* until the tube 7' fires at the desired instant. The position of the index 23 at the instant of firing, taken with the setting of the potentiometer 13, which, in this relationship, may be employed as a vernier, will indicate the time lapse between the initiation of the movement of the shutter element and the instant of the operation of the tube 7'.

In this connection it will be apparent that with the switch 39 connected to the terminal 42, the device is useful for the calibration of the potentiometer 13 in time intervals. The variable load 36 is provided to compensate for the absence of a photo-flash bulb where the device is to be used to determine the operating characteristics of a camera shutter structure adapted to be used in photo-flash photography the photo-flash unit of the camera being normally comprised of the battery 37, the solenoid 3' and the photo-flash lamp. The substitution of the variable load 36 for such photo-flash lamp serves to eliminate variations in the operation of the shutter controlling solenoid 3' for the purpose of the test.

The application of my invention to the observation of moving elements other than photographic shutters will be apparent, and while I have specifically disclosed my invention as applied thereto I do not choose to consider my invention as limited to this specific application nor to the precise details of application herein described and illustrated, but rather to the scope of the subjoined claims.

I claim:

1. In a device for observing the operating characteristics of a moving element, the combination which comprises: an electronic illumination source adapted upon suitable application of electrical energy for the production of a short-duration illumination pulse and positioned for illumination of said element; means defining a first control circuit including a first light-responsive means and adapted to cause initiation of the movement of such element upon energization of said light-responsive means; means defining a second control circuit including a second light-responsive means and adapted to initiate supply of electrical energy to said illumination source upon energization of said second light-responsive means; and means for energizing said first and second light-responsive means in time-related sequence so as to cause said electrical energy supply to be initiated at a known time interval after the initiation of the movement of said element.

2. In a device for observing the operating characteristics of a moving element, the combination which comprises: an electronic illumination source adapted upon suitable application of electrical energy for the production of a short-duration illumination pulse and positioned for illumination of said element; a first circuit for initiating the movement of such element; a second circuit for initiating the application of electrical energy to said illumination source; each of said circuits including a light-responsive means for energizing the corresponding circuit upon energization of the respective light-responsive means; and manually variable means for causing the light-responsive means of said second circuit to be energized at a known time interval after the energization of the light-responsive means of said first circuit.

3. In a device for observing the operation of a moving element, the combination which comprises: an illumination source comprising a gaseous discharge tube having a cathode, an anode and a control grid; a condenser connected between said cathode and said anode; a source of direct current; means for connecting said current source to said condenser to charge the condenser and establish a potential between said cathode and anode; a resistance : capacity network for supplying potential to said grid, including manually variable resistance means calibrated in intervals of time; means for initiating the movement of said element; and means operable in timed relation to the initiation of such movement to disconnect said condenser and anode from said current source and to connect them to said resistance:capacity network through said variable resistance means to cause the gaseous discharge tube to fire.

4. In a device for observing the operating characteristics of a moving element, the combination which comprises: an electronic illumination source adapted, upon application of electrical energy, to produce a short-duration illumination pulse and positioned for illumination of said element; a first circuit for initiating the movement of such element; a second circuit for applying electrical energy to said illumination source and including means to delay the production of said illumination pulse for a given interval of time after energization of said second circuit; a light-responsive means; means responsive to energization of said light-responsive means to energize said first and second circuits; and a rotatable shutter member provided with light-transmitting means for controlling the energization of said light-responsive means, said shutter member being provided with scale means rotatable therewith and carrying indicia means positionally related to said light-transmitting means and positioned to be illuminated by said illumination source.

FRANK ABELL.

REFERENCES CITED

The following references are of record in the file of this patent:

UNITED STATES PATENTS

| Number | Name | Date |
|---|---|---|
| 2,332,587 | Mendelsohn et al. | Oct. 26, 1943 |
| 2,376,162 | Merriman et al. | May 15, 1945 |
| 2,382,981 | Edgerton | Aug. 21, 1945 |
| 2,446,533 | England | Aug. 10, 1948 |